United States Patent
Feder

[15] 3,694,037
[45] Sept. 26, 1972

[54] CLOSED CIRCUIT PNEUMATIC CONVEYING

[72] Inventor: Friedhelm R. Feder, Memphis, Tenn.

[73] Assignee: Wedco, Inc., Garwood, N.J.

[22] Filed: April 30, 1970

[21] Appl. No.: 33,468

[52] U.S. Cl. .................. 302/22, 302/27, 302/35, 302/42
[51] Int. Cl. ...... B65g 53/06, B65g 53/28, B65g 53/66
[58] Field of Search .......... 302/21, 22, 35, 42, 59, 27

[56] References Cited

UNITED STATES PATENTS

| 2,934,632 | 4/1960 | Todd | 302/22 X |
| 3,115,369 | 12/1963 | Bozich | 302/59 X |

FOREIGN PATENTS OR APPLICATIONS

| 800,877 | 9/1958 | Great Britain | 302/22 |
| 560,469 | 8/1953 | Canada | 302/42 |

Primary Examiner—Evon C. Blunk
Assistant Examiner—W. Scott Carson
Attorney—Frank M. Murphy and Burgess, Dinklage & Sprung

[57] ABSTRACT

A closed circuit pneumatic conveying systems for conveying finely divided solids comprising, in a loop, a pick-up station, separator, air pump, and a return air conduit vented to the atmosphere. A throttle valve is interposed between the return air line and the vent. By adjusting the throttle valve, the rate of pick up can be varied according to demand. The system is useful for unloading semi-free flowing material, e.g. polypropylene flake, from a railroad hopper car.

3 Claims, 1 Drawing Figure

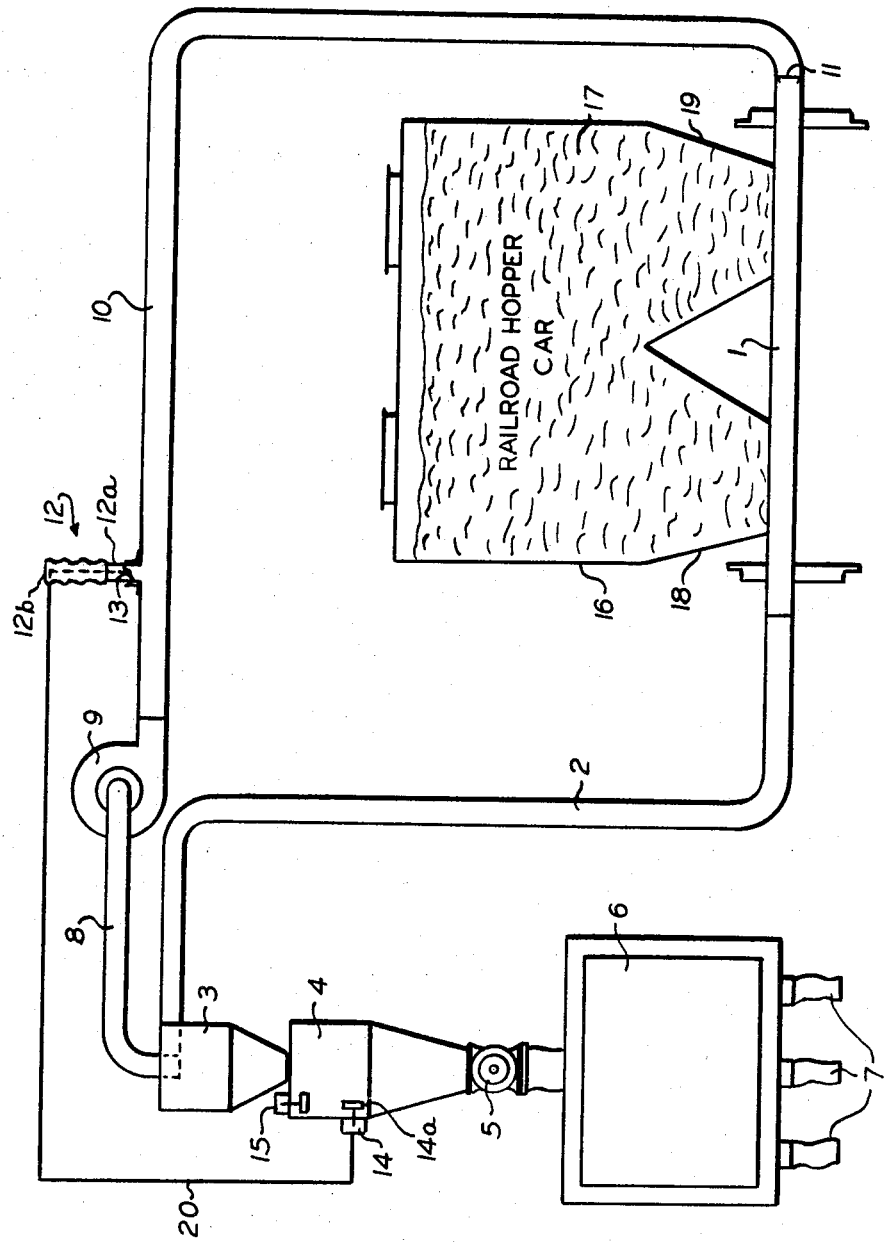

CLOSED CIRCUIT PNEUMATIC CONVEYING

BACKGROUND

The present invention relates to pneumatic conveyance of materials, employed to transport finely divided solids from, for example, a railroad hopper car to a storage container therefor within a manufacturing plant.

In such systems an air stream is contacted with the finely divided solids at the pick up location so that the solids become suspended in the air stream, which carries the particles to a delivery point, where the air stream enters an air-solids separator. The air stream can be discharged from the separator to the atmosphere, or can be recycled to the pick up station. If discharged to the atmosphere, polluting with dust is a problem, unless the air before discharge is passed through filters. The use of filters is not desirable due to the added equipment cost and the added power requirements for providing the pressure necessary to effect the filtering. These factors commonly result in the choice of recycling, i.e., the use of a closed circuit system.

In a closed circuit system, the air pump or blower is interposed in the line connecting the separator with the pick up point. It is desirable in order to reduce to a minimum the discharge of dust from the system, to maintain the equipment between the pick up station, and the blower, i.e., the conduit between the pick up station and the separator, the separator, and equipment associated with the separator, under a negative pressure, while maintaining a positive pressure between the blower and pick up station. To assure this condition, an air vent is installed on the discharge side of the blower in the line connecting the blower and the pick up station, and a restriction, e.g., a nozzle, is installed in that line just up stream of the pick up point. The air vent is commonly composed of a short nipple communicating with the air line at one end thereof, and having mounted on the other end thereof, a sock for filtering dust from the air vented to the atmosphere.

THE INVENTION

Difficulty has been encountered in utilizing the closed circuit, pneumatic conveying system described above, for unloading semi-free flowing materials from railroad hopper cars. In particular, difficulty has been encountered in handling polypropylene flake.

By "semi-free flowing" material is meant material of such character that it does not flow at a uniformed rate from a mass thereof, downwardly through an opening of such size as to throttle the flow through the opening; rather, the material flows through such an opening at a varying rate.

The varying discharge rate encumbers operation where the unloading is coupled with processing of the solid material in a continuous manner. Thus, where the solids collected in the separator are continuously passed to, for example, a sifter or a size reducing mill, the feed to the processing step tends to be non-uniformed, a condition which is generally unsatisfactory.

It has been found that the disadvantages described above can be overcome by installing a throttle valve in the air vent for throttling flow of the vented air. Moving the throttle toward the closed position tends to increase the air flow through the return air line, and to reduce the amount of the solid that is picked up at the supply point; moving the throttle valve toward the opened position, has the opposite effect.

Thus, the invention is concerned with a closed circuit pneumatic conveying system for transporting solids from a hopper at a pick up location to a delivery location by suspending the solids in air at the pick up location and transferring the suspension to the delivery location, and thereat separating the solids from the air, and returning the air to the pick up location. Such a system includes a pick up conduit, which is part of the said circuit, for being placed in opened communication with the hopper for receiving solids by gravity flow, and a separator means for receiving air-solids suspension at the delivery location and thereat separating the solids from the air, with a conduit, which is part of the circuit, communicating the pick up conduit with the separator. An air pump is provided for circulating air through the circuit, and a conduit communicates the separator with the pump inlet, while an air return conduit, also part of the circuit, communicates the pump discharge with the pick up conduit. The air return conduit has a restriction, e.g., a nozzle, for maintaining the air in the conduit between the pump discharge and the restriction at a positive pressure. Also, a vent means is installed in the air return conduit between the restriction and the pump discharge, for bleeding some air from the system and maintaining a negative pressure down stream of said restriction, and preferably at the pick up location, to the pump inlet. The invention provides the improvement of a throttle valve interposed between the air return line and the vent for counteracting the aforementioned effect of the tendency of the solids to drop at non-uniform rate into the air stream at the pick up location.

The system can be used in combination with means for continuously processing the solids separated by the separator, such as a sifter. The separated solids can be collected in a hopper interposed between the separator and the continuously operating processing means. Sensing means can be provided for sensing the amount of separated solids in the hopper, and the sensing means can be linked to the throttle valve for controlling the operation thereof, moving the valve toward the opened position when the demand for material in the hopper is large, and moving the valve toward the close position when said demand is low.

EMBODIMENT

The invention is further illustrated in the accompanying drawing, which is a schematic flow sheet illustrating the invention.

A dry flow, railroad hopper car 16, filled with polypropylene flake 17, has two discharge hoppers 18 and 19. An adjustable discharge valve (not shown) is provided at the lower end of each of the hoppers. The hopper car is connected with a pneumatic conveying system, for unloading of the car. The pick up conduit 1 of the pneumatic system is communicated with the hoppers 18 and 19 to receive material from the car. Air forced by blower 9 through conduit 10 enters the pick up conduit and entrains material falling from the car into the pick up conduit. The resulting suspension is conveyed through conduit 2 to separator 3, which is a conventional cyclone separator serving to separate the solids from the air stream. Air passes from the separator to the intake of blower 9, via conduit 8.

The solids separated in separator 3 fall into hopper 4. A mass of the material is maintained in hopper 4. The hopper is outfitted with a star valve 5, which serves the dual function of providing an air lock between the equipment down stream of the star valve and the blower 9, and feeding the material at a uniform rate from the hopper to sifter 6, which separates the material into fractions of different sizes. The various fractions are discharged from outlets 7.

In order to prevent dust issuing from the equipment such as separator 3 and hopper 4, and also the railroad car 16, a restriction in the form of nozel 11 is placed in the air return line 10, adjacent the pick up conduit 1, and a vent 12 is installed in the air return line 10, adjacent the discharge of the blower 9. In operation, the pressure between the discharge of the blower 9, and the restriction 11, is positive (above atmospheric) and the pressure between the restriction 11 and the blower intake is negative (below atmospheric). Thus, issuance of dust, as mentioned, is prevented.

The vent 12 is composed of nipple 12a, communicating at one end with the air return conduit 10, and a sock 12b, mounted on the other end of the nipple. The sock can be a small fabric bag which will permit passage of air from the system to the atmosphere, while filtering out dust.

The system as described above, is known.

When this system is utilized to unload semi-free flowing material, e.g., polypropylene flake, from a dry flow hopper car, difficulty is encountered since the material does not flow at a uniformed rate through the valves of the car hoppers 18 and 19. In operation, constant manual adjustment of those valves is necessary.

According to the invention, a control valve or throttle valve 13 is installed in the nipple 12a of vent 12, to meter the air which passes through the vent. By adjusting the valve 13, the rate of material flow from the hopper car 16 can be controlled. If the valve 13 is closed, the valves in the bottom of the hoppers 18 and 19 can be almost completely open, and yet practically no material flows from the hopper car. As the valve 13 is opened, the material starts to flow from the hopper car to the pneumatic conveying system. As the valve 13 is moved towards the open position, the rate of flow of material from the car to the system, increases. Since the material is not free flowing, a given setting of valve 13, when the valves in the bottom of hoppers 18 and 19 are left at a constant position, does not provide a uniform flow rate from the car. By constant adjustment of valve 13, however, the flow can be controlled so that it is substantially constant or does not vary in a way complicating other operations. This adjustment can be provided automatically so that the requirements for the processing at the sifter 6 are met.

The needed adjustment is provided by outfitting the hopper 4 with a level control 14, which senses the amount of material in the hopper 4. The level control 14 is connected by linkage 20 with the throttle valve 13. Upon the level of the material in the hopper 4 reaching the level controller sensor 14a, the linkage 20 operates to slowly move the throttle valve 13 toward the closed position, thus reducing the rate of flow of solids into the separator and into the hopper 4. Accordingly, the level of the material in hopper 4 starts to fall. When it falls below the sensor 14a, the linkage 20 responds and actuates the throttle valve 13 to slowly move it toward the open position, causing the air stream to pick up more material in the pick up conduit 11. The throttle valve 13 is in motion at all times between the minimum and maximum opening, when the system is in operation. The hopper 4 is also provided with sensor 15 which is disposed at the top of the hopper, and is suitably installed so as to shut down the system in the event that the material in hopper 4 moves up to near the top of the hopper.

The star valve 5 mounted at the hopper outlet, serves to feed the material at a constant rate to the sifter 6, and as an air lock.

If desired, the lower part of separator 3 can be used as the hopper, and the hopper 4 can be dispensed with.

In the known systems described above, commonly the line 10 is 2 – 10 inches and the nipple 12a is 1 – 5 inches. In the systems of the invention, the line sizes can be the same. For a commercial system the loop line is 6 inches and line 12 is 3 inches.

The reasons for the operation of the systems as described, i.e., the reason why closing valve 13 reduces flow from the hopper can 16 into the systems and visa versa, is not surely known. It may be that closing of valve 13, increases the velocity of the air in the pick up conduit 1, and that this tends to prevent material from falling into the pick up conduit from the hopper, and visa versa.

While the invention has been described with respect to a particular embodiment thereof, that embodiment is merely representative of the invention and does not set the limits thereof.

What is claimed is:

1. In a closed circuit pneumatic conveying system for transporting solids from a hopper at a pick up location to a delivery location by suspending the solids in air at the pick up location and transferring the suspension to the delivery location and thereat separating the solids from the air, and returning the air to the pick up location, comprising:

a. a pick up conduit for being placed in open communication with the hopper for receiving solids by gravity flow, b. separator means for receiving air-solids suspension at the delivery location and thereat separating the solids from the air, and a conduit communicating the pick up conduit with the separator for conveyance of air-solids suspension from the pick up location to the separator, c. an air pump for circulating air through the circuit, and a conduit communicating the separator with the pump inlet, d. an air return conduit communicating the pick up conduit with the outlet of the air pump, said air return conduit having a restriction for maintaining the air in the circuit between the pump discharge and the restriction at a positive value, and e. a vent means in the air return conduit between said restriction and the pump discharge for venting some air from the systems to the atmosphere and maintaining a negative pressure downstream of said restriction to the pump inlet, the improvement which comprises:

f. a throttle valve interposed between the air return line and the vent, and g. means for controlling the throttle valve in dependence on demand for solids at the separator, for moving the throttle valve toward the open position when the demand is large and moving the throttle valve toward the closed position when the demand is low.

2. Conveying systems according to claim 1, said pneumatic conveying system including:

h. a hopper communicating with said separator for receiving separated solids therefrom, said means for controlling the throttle valve comprising:

i. sensing means for sensing the amount of separated solids in the hopper communicated with the separator, and j. linkage means interconnecting the sensing means and the throttle valve for controlling the operation of the throttle valve for operation thereof as aforesaid.

3. Conveying systems according to claim 1, and in combination therewith:

k. means for continuously processing the solids separated by the separator, l. means for continuously delivering solids to said processing means from the separator, including a hopper communicating with said separator for receiving separated solids therefrom, said control means comprising:

m. sensing means for sensing the amount of separated solids in the hopper communicated with the separator, and n. linkage means interconnecting the sensing means and the throttle valve for controlling the operation of the throttle valve, moving throttle valve as aforesaid.

* * * * *